(12) United States Patent
Frazier

(10) Patent No.: US 8,379,293 B2
(45) Date of Patent: Feb. 19, 2013

(54) METHOD AND APPARATUS FOR MODULATING LIGHT

(75) Inventor: Gary A. Frazier, Garland, TX (US)

(73) Assignee: Raytheon Company, Waltham, MA (US)

( * ) Notice: Subject to any disclaimer, the term of this patent is extended or adjusted under 35 U.S.C. 154(b) by 91 days.

(21) Appl. No.: 12/914,534

(22) Filed: Oct. 28, 2010

(65) Prior Publication Data

US 2012/0105937 A1 May 3, 2012

(51) Int. Cl.
*G02B 26/00* (2006.01)

(52) U.S. Cl. ..................... 359/296; 359/245

(58) Field of Classification Search ............ 359/296
See application file for complete search history.

(56) References Cited

U.S. PATENT DOCUMENTS

2009/0201570 A1* 8/2009 Frazier et al. ............... 359/296

OTHER PUBLICATIONS

Ph Lalanne et al., "One-Mode Model and Airy-Like Formulae for One-Dimensional Metallic Gratings," J. Opt. A: Pure Appl. Opt 2 (2000) 48-51, Printed in the UK, pp. 48-51, Nov. 4, 1999.
Kristensen et al., "Frequency Selective Surfaces as Near-Infrared Electromagnetic Filters for Thermophotovoltaic Spectral Control," Journal of Applied Physics, vol. 95, No. 9, May 1, 2004, 7 pages.
Monacelli et al., "Infrared Frequency Selective Surfaces: Design, Fabrication and Measurement," School of Optics, SPIE Infrared Technology and Applications XXX Conference, Apr. 12-16, 2004, 8 pages.
Remski et al., "Frequency Selective Surfaces," Design and Analysis Using the Ansoft Product Suite, Ansoft Corporation, Presentation #4, 34 pages, 2000.
Monacelli et al., "Infrared Frequency Selective Surfaces," IEEE 2004, pp. 2175-2178, 4 pages, 2004.
Reed, Jeffrey, "Frequency-Selective Surfaces with Multiple Apertures within a Periodic Cell," J. Opt. Soc. Am. A/vol. 15, No. 3, Mar. 1998, 9 pages.
Hooberman, Benjamin, "Everything You Ever Wanted to Know About Frequency-Selective Surface Filters but Were Afraid to Ask," pp. 1-22, May 2005.

* cited by examiner

*Primary Examiner* — James Jones
(74) *Attorney, Agent, or Firm* — Thorpe North & Western LLP

(57) ABSTRACT

An apparatus for modulating light includes a first electrode, a second electrode, and a sealed enclosure. The first electrode includes a frequency selective surface operable to reflect light having a first wavelength, and the second electrode is spaced apart from the first electrode. The sealed enclosure stores electrophoretic fluid and at least a portion of the sealed enclosure is positioned between the first electrode and the second electrode. A plurality of particles are suspended in the electrophoretic fluid. The particles are capable of absorbing light having the first wavelength. In addition, the first electrode is capable of attracting the particles towards the frequency selective surface when an electrical bias is applied between the first electrode and the second electrode.

20 Claims, 3 Drawing Sheets

METHOD AND APPARATUS FOR MODULATING LIGHT

TECHNICAL FIELD

This disclosure relates generally to light modulators and, in particular, to light modulators that utilize electrophoretic particles.

BACKGROUND OF THE INVENTION

Electrophoretic light modulators utilize electric fields to control the movement of electrically-charged particles that are typically suspended in fluid. In a typical, electrophoretic light modulator an electric force provided by a battery is used to cause such particles to move toward or away from a viewing surface. The electrodes in such a modulator may be made optically transparent and arranged as a parallel plate capacitor with the electrophoretic particles filling the void between the plates. In such a configuration, particles of differing color may be alternatively moved to or away from the viewing surface so that the color of certain portions of the surface change based on the color of the affected particles.

Unlike the structurally-similar liquid crystal light modulators, electrophoretic modulators transport material within a fluid to the viewing surface. Polarization effects may be eliminated if the particles themselves have no inherent anisotropic or polarization properties. The speed of an electrophoretic light modulator can exceed video rates. It is also possible to construct an electrophoretic light modulator to be bi-stable in its modulation behavior. That is, the electrophoretic particles can be made to remain at one optical surface or the other even after the excitation field has been applied and then removed. This is accomplished by coating the inner surfaces of the modulation cell with material that induce an electrostatic attraction between the particles and the inner surfaces when the particles close to within a certain range. The particles will then "stick" to the inner surface of the modulator cell until a reverse field breaks these weak Van der Waals bonds and pulls the particles away and back into suspension. This can result in optical displays with very low electrical power consumption. Electrophorectic light modulators are now making their way into the mainstream of optical displays under the general names of electronic paper or e-paper.

Despite their benefits, many electrophoretic modulators suffer from (1) limited or no ability to modulate certain wavelengths of light with high contrast, and (2) limited or no ability to reflect light in a specular manner. For example, it may be desirable for a light modulator to have very high specular reflectance in one state, and very high absorbance in another state. The use of electrophoretic particles can make it easy to obtain high optical absorption, but difficult to obtain high specular reflectance due to the random, diffuse nature of light scattering from an ensemble of small particles.

SUMMARY OF DESCRIBED EMBODIMENTS

The present disclosure provides a method and apparatus for modulating light. Particular embodiments substantially reduce or eliminate at least some of the disadvantages and problems associated with previous light modulators.

In accordance with one embodiment described by the present disclosure, an apparatus for modulating light includes a first electrode, a second electrode, and a sealed enclosure. The first electrode includes a frequency selective surface operable to reflect light having a first wavelength, and the second electrode is spaced apart from the first electrode. The sealed enclosure stores electrophoretic fluid and at least a portion of the sealed enclosure is positioned between the first electrode and the second electrode. A plurality of particles are suspended in the electrophoretic fluid. The particles are capable of absorbing light having the first wavelength. In addition, the first electrode is capable of attracting the particles towards the frequency selective surface when an electrical bias is applied between the first electrode and the second electrode.

In accordance with another embodiment described by the present disclosure, an apparatus for modulating light includes a first electrode, a second electrode, and a sealed enclosure. The first electrode includes a frequency selective surface operable to reflect light having a first wavelength, and the second electrode is spaced apart from the first electrode. The sealed enclosure stores electrophoretic fluid and at least a portion of the sealed enclosure is positioned between the first electrode and the second electrode. A plurality of particles are suspended in the electrophoretic fluid and, the first electrode is capable of attracting the particles towards the frequency selective surface when an electrical bias is applied between the first electrode and the second electrode. In addition, the particles are capable of altering a dielectric constant of the frequency selective surface when attracted to the frequency selective surface.

Important technical advantages of certain embodiments of the present invention include a modulator capable of providing high optical reflectance in one state and high optical absorption in another state. Additionally, particular embodiments may capable of modulating incident light incident such that light across one or more specific spectral bands is reflected, scattered, absorbed, or otherwise modulated with an electronically-controlled average intensity. Furthermore, particular embodiments of the modulator may support rates greater than or equal to video rates (>30 Hz), have appropriate spectral bandwidth, provide high optical (on/off) contrast, and operate at very low electrical power.

Other technical advantages of the present invention will be readily apparent to one skilled in the art from the following figures, description, and claims. Moreover, while specific advantages have been enumerated above, various embodiments may include all, some, or none of the enumerated advantages.

BRIEF DESCRIPTION OF THE DRAWINGS

For a more complete understanding of the various embodiments of the present disclosure, reference is now made to the following description, taken in conjunction with the accompanying drawings, in which.

DETAILED DESCRIPTION OF PARTICULAR EMBODIMENTS

Figure 1:
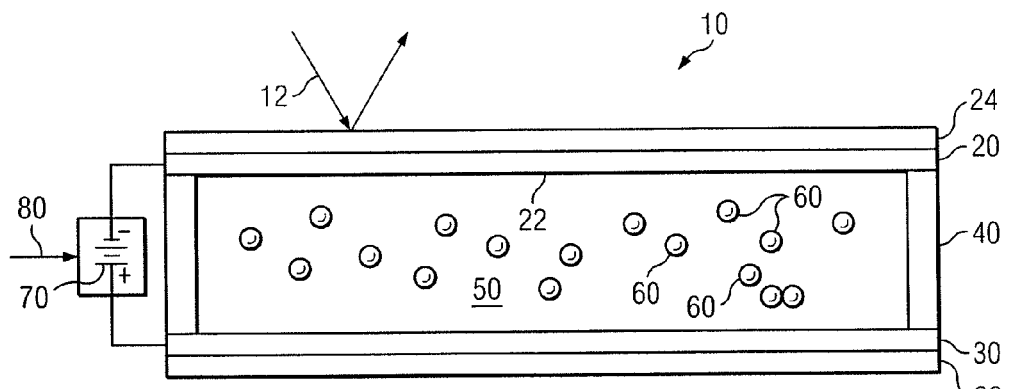
FIG. 1 shows a light modulator according to a particular embodiment of the present disclosure.

FIG. 1 illustrates a particular embodiment of a modulation system 10 in accordance with a particular embodiment of the present disclosure. The illustrated embodiment includes a first electrode 20, a second electrode 30, a sealed enclosure 40, electrophoretic fluid 50, a plurality of particles 60, and a power supply 70. Additionally, first electrode 20 comprises a frequency selective surface 22 Modulation system 10 modulates light 12 incident upon modulation system 10 by altering one or more optical characteristics of frequency selective surface 22. In particular embodiments, this is achieved by moving particles 60 towards or away from frequency selective surface 22.

First electrode 20 and second electrode 30 are electrical conductors positioned on opposite sides of sealed enclosure 40. First electrode 20 and second electrode 30 may represent conductors of any appropriate material suitable for use in the described system. In particular embodiments, first electrode 20 and second electrode 30 represent metal strips. As described further below, an electrical bias applied across first electrode 20 and second electrode 30 by a voltage supply 70 will attract or repel particles 60 from first electrode 20 and have the opposite affect with respect to second electrode 30. In particular embodiments, modulation system 10 may include additional support elements, such as transparent topstrate 24 and backplane support 26, that have minimal or no optical effect on the operation of modulation system 10.

Frequency selective surface 22 alters the propagation of incident light 12 having a particular wavelength (referred to here as the "design wavelength"). For purposes of this description and the claims that follow, frequency selective surface 22 may alter the propagation of incident light 12 by reflecting, absorbing, polarizing, phase-shifting, or otherwise changing incident light waves in any appropriate manner.

In particular embodiments, frequency selective surface 22 may represent a "perforated" frequency selective surface—that is, a conducting sheet, such as a metal strip, perforated by an array of apertures. Although a perforated frequency selective surface 22 is not continuous, its various edges may still be electrically connected. A perforated frequency selective surface 22 may conduct electric current from one edge to another since the many conducting elements that define the perforated frequency selective surface 22 may be locally connected. For this type of frequency selective surface 22, the entirety of first electrode 20 may be connected to voltage supply 70 by making electrical contact to any part of frequency selective surface 22. The applied voltage will be propagated across frequency selective surface 22 via the connections between the metallic features.

Figure 3:
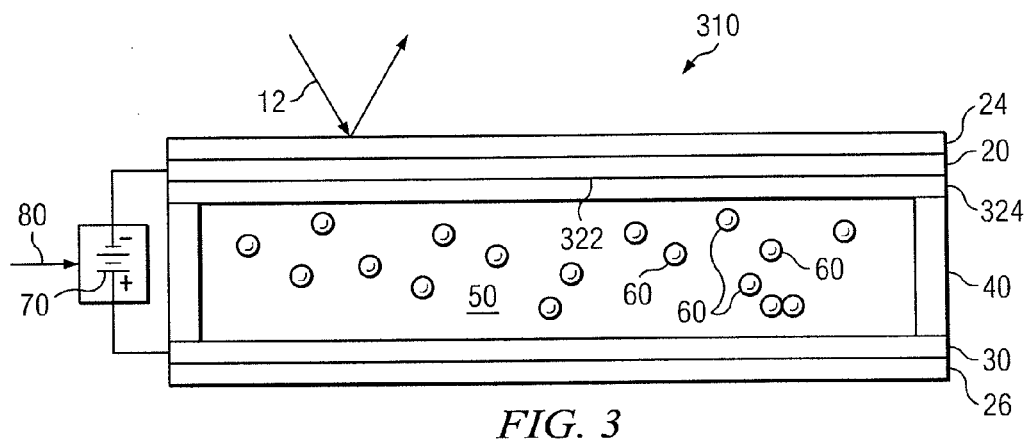
FIG. 3 shows a light modulator according to another embodiment of the present disclosure.

In alternative embodiments, frequency selective surface 22 may represent an "open" frequency selective surface—that is, an array of structures formed from conducting material, such as metal. Examples of the types of structures that may make up an open frequency selective surface 22 include, but are not limited to, isolated metal islands, crosses, rings, and dipoles. In an open frequency selective surface 22, these structures may not be electrically connected and may not on their own connect one edge of first electrode 20 to another. As a result, a conductor may need to be provided to relay applied voltages across the surface of an open frequency selective surface 22. In particular embodiments, this may be accomplished by forming the open frequency selective surface 22 on a thin sheet of electrically conducting material. FIG. 3 illustrates an example of an embodiment of modulation system 10 that utilizes such a conducting layer with an open frequency selective surface 22.

Sealed enclosure 40 represents any sealed structure capable of containing electrophroetic fluid 50. In particular embodiments, sealed enclosure 40 is formed, at least in part, from a non-conductive seal ring that enclose electrophoretic fluid 50. Although shown in FIG. 1 as having a single wall, in alternative embodiments, sealed enclosure 40 may include multiple walls dividing sealed enclosure 40 into several cells that inhibit movement of particles 60 transverse to frequency selective surface 22. While sealed enclosure 40 may be formed from any suitable material, in particular embodiments, sealed enclosure 40 comprises a thin plastic wall that is transparent to light at a first wavelength. In particular embodiments, frequency selective surface 22 may be exposed to electrophoretic fluid 50 or placed in as close a proximity as practical to electrophoretic fluid 50 to facilitate the electromagnetic interaction between frequency selective surface 22 and particles 60. As a result, in particular embodiments, frequency selective surface 22 may be contained within sealed enclosure 40 or may directly abut sealed enclosure 40.

In operation, particles 60 are attracted or repelled by frequency selective surface 22 through the action of an electrical bias applied across first electrode 20 and second electrode 30. Depending on the charge on particles 60 and the polarity of the electrical bias applied across first electrode 20 and second electrode 30, particles 60 may be attracted towards frequency selective surface 22 or forced away from frequency selective surface 22.

As particles 60 are forced away from first electrode 20, their effect on light 12 incident upon frequency selective surface 22 decreases. The electromagnetic interaction between frequency selective surface 22 and particles 60 is a very strong function of the distance between particles 60 and the surface of frequency selective surface 22. As a result, this interaction decreases exponentially with the distance between particles 60 and the surface of frequency selective surface 22. In particular embodiments, particles 60 have no noticeable effect on the reflectance of frequency selective surface 22 for a particular wavelength of light 12 when particles 60 are positioned more than one-tenth ($\frac{1}{10}$th) of the wavelength away from frequency selective surface 22.

As a result, when particles 60 are positioned away from frequency selective surface 22, the optical reflectance of frequency selective surface 22 is determined by the specific patterns of apertures or conducting structures that form frequency selective surface 22. Thus, if frequency selective surface 22 is designed to strongly reflect light at a particular design wavelength, modulation system 10 will strongly reflect incident light 12 in this design wavelength when particles 60 are positioned away from frequency selective surface 22.

If the polarity of the electrical bias changes so that particles 60 are instead attracted to first electrode 20, their effect on incident light 12 increases. In particular embodiments, frequency selective surface 22 comprises a thin planar sheet that has the same effect upon light reflected from either of its facets. That is, both surfaces of frequency selective surface 22 are coupled electromagnetically and what happens optically to one surface affects the opposite surface. Thus, particles 60 which alter the optical properties of the reverse side of frequency selective surface 22 will propagate this effect to the obverse side of frequency selective surface 22.

As a result, when particles 60 draw close to frequency selective surface 22 within sealed enclosure 40 then the optical reflectance of frequency selective surface 22 with respect to incident light 12 at the first wavelength is altered. This alteration may take the form of a shift in the frequency of maximum optical reflectance or a change in the amplitude of light reflected from the surface. The magnitude and nature of this change will depend on the properties of particles 60 and other aspects of modulation system 10. In particular embodiments, particles 60 will have a noticeable effect on the reflectance of frequency selective surface 22 for a particular wavelength when particles 60 are positioned less than 1/10th of the wavelength away from frequency selective surface 22.

In this state, the optical reflectance of frequency selective surface 22 is determined by the specific patterns of conductors used to form frequency selective surface 22 and electromagnetic interactions which may occur between the electromagnetic fields at, between, and among the patterned conductors of frequency selective surface 22 and particles 60. The optical effect achieved may depend on the design of frequency selective surface 22 and the composition of particles 60.

As one example, in particular embodiments, particles 60 represent particles of electrically-charged carbon or another material that is strongly absorbing of light 12 at the design wavelength. In such embodiments, when particles 60 are brought close to frequency selective surface 22, energy will be coupled from frequency selective surface 22 into the absorbing particles 60, and optical energy which would have been reflected from the upper surface of frequency selective surface 22 will instead be absorbed. The effect of this absorption is to reduce or eliminate the reflectance of frequency selective surface 22, and at least a portion of the incident light 12 at the design wavelength is not reflected.

As another example, in particular embodiments, particles 60 may be chosen to have a high dielectric constant at the design wavelength of frequency selective surface 22. In such embodiments, motion of particles 60 towards frequency selective surface 22 may change the local dielectric constant of frequency selective surface 22 instead of, or in addition to, absorbing energy from light reflected by frequency selective surface 22. This increase in the dielectric constant in the vicinity of the apertures or structures of frequency selective surface 22 generally causes a shift of spectrum response produced by frequency selective surface 22 to longer wavelengths. Consequently, the use of these non-absorbing particles 60 may induce a frequency shift in the maximum reflectance of frequency selective surface 22.

As yet another example, in particular embodiments, particles 60 may comprise particles of metal. Motion of metal particles 60 toward or away from frequency selective surface 22 will generally cause a shift in the frequency characteristics, which may include increasing the reflectance of modulation system 10 at other wavelengths, inducing optical absorption at other wavelengths, or a combination of these effects. Thus, in such embodiments, when metal particles 60 are attracted close to frequency selective surface 22, a change in the frequency characteristics of reflected light may occur.

In general, when particles 60 are again repelled from frequency selective surface 22, the optical effect of particles 60 is reduced or eliminated and frequency selective surface 22 reverts to its previous state. In particular embodiments, the impact of particles 60 may diminish as particles 60 move away from frequency selective surface 22, and their effect decreases to a negligible amount for a particular wavelength of light beyond a distance greater than 1/10th the relevant wavelength.

As a result, modulation system 10 may effectively modulate light 12 incident upon modulation system 10 by moving particles 60 between different positions, each position associated with a particular state of modulation system 10. For example, modulation system 10 may receive a signal 80 that is used to control the magnitude or polarity of a voltage provided by voltage supply 70. Modulation system 10 may communicate information from signal 80 by modulating incident light 12 based on the state of signal 80. An example of this process is illustrated by FIGS. 2A and 2B, which show a particular embodiment of modulation system 10 in operation.

Thus, by selecting size, spacing, and other features of the apertures of a perforated frequency selective surface 22 or the structures of an open frequency selective surface 22 and by selecting the material and other properties of particles 60, modulation system 10 can be designed to effectively modulate incident light 12 at a design wavelength in a predetermined manner. In this manner, particular embodiments of modulation system 10 may provide specular reflectance in one state and reduced reflectance or complete absorption in another state. Because many types of conventional electrophoretic devices cannot provide specular reflectance or cannot provide a high level of contrast for chosen wavelengths, particular embodiments of modulation system 10 may offer significant advantages. Additionally, modulation system 10 may be capable of operating at rates sufficient for video (e.g., greater than 30 Hz) and with low power requirements. Thus, particular embodiments of modulation system 10 may provide several operational benefits. Specific embodiments, however, may provide some, none, or all of these benefits.

Figure 2A:
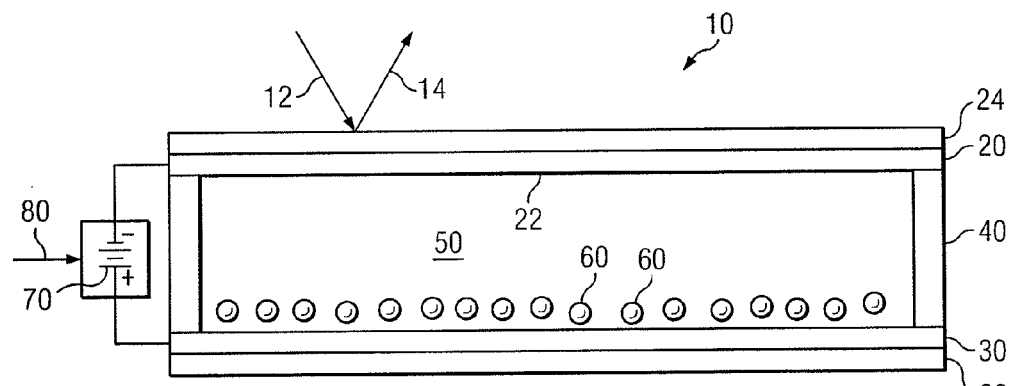
FIGS. 2A and 2B illustrate example operation of a particular embodiment of the light modulator shown in FIG. 1.
Figure 2B:
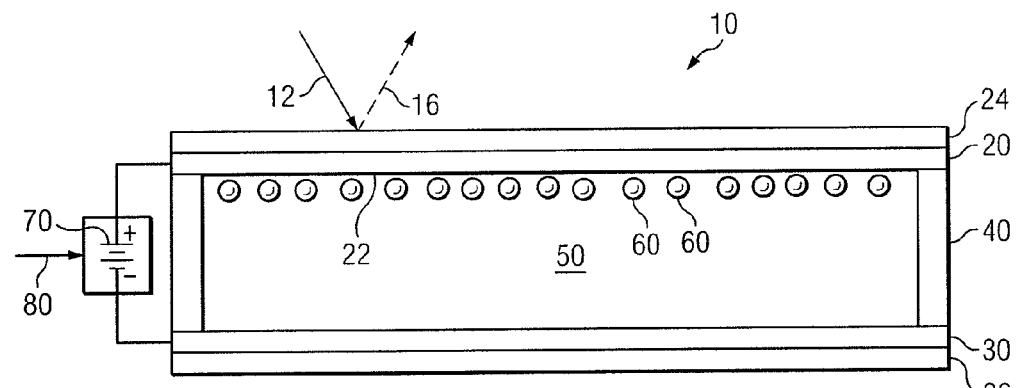

FIG. 2A shows a particular embodiment of modulation system 10 operating in a first state. In the illustrated embodiment, the state of modulation system 10 is set by received signal 80. Additionally, in the illustrated embodiment, frequency selective surface 22 comprises a metal strip with an array of cross-shaped cutouts. Consequently, frequency selective surface 22 reflects incident light 12 at a first wavelength associated in the illustrated embodiment, particles 60 have been selected to absorb incident light at a first wavelength.

When received signal 80 is in a first state, voltage supply 70 applies an electrical bias across first electrode 20 and second electrode 30 that repels particles 60, such as electrically-charged carbon, away from first electrode 20. In the illustrated embodiment, this bias induces particles 60 to move further than approximately one tenth (1/10th) of the design wavelength away from frequency selective surface 22. In this state, the optical reflectance of frequency selective surface 22 is determined by the specific patterns of apertures or conducting structures used to form frequency selective surface 22. For example, in the illustrated embodiment, modulation system 10 is assumed to have a design wavelength of two micrometers (2 μm). As a result, frequency selective surface 22 is designed to strongly reflect (denoted by arrow 14) light having a 2-μm wavelength, when particles 60 are not positioned close to the surface of frequency, selective surface 22. Thus, in this first state, modulation system 10 will strongly reflect (denoted by arrow 14) incident light 12 having a 2-μm wavelength, as shown in FIG. 2A.

FIG. 2B shows the same embodiment of modulation system 10 operating in a second state. In particular, FIG. 2B shows modulation system 10 after signal 80 has transitioned to a second state. In response to the transition in signal 80, voltage supply 70 changes the polarity of the electrical bias applied across first electrode 20 and second electrode 30. This change in polarity causes first electrode 20 to attract particles 60 towards frequency selective surface 22.

Once positioned near frequency selective surface 22, particles 60 alter the effect that modulation system 10 has on incident light 12. In particular embodiments, once particles 60 are positioned closer to frequency selective surface 22 than approximately 1/10th of the design wavelength, these particles 60 will begin to change the effect modulation system 10 has on incident light 12. In this state, the optical reflectance of frequency selective surface 22 is determined by the specific patterns of conductors used to form frequency selective surface 22 as well as electromagnetic interactions that may occur between the electromagnetic fields at, between, and among the patterned conductors of frequency selective surface 22 and particles 60. If particles 60 are strongly absorbing of light at the design wavelength of frequency selective surface 22, then energy will be coupled from frequency selective surface 22 into the absorbing particles 60 and optical energy which would have been reflected from the upper surface of frequency selective surface 22 will instead be absorbed. The effect of this absorption is to reduce or eliminate the reflectance of frequency selective surface 22, and at least a portion of the incident light 12 at the first wavelength is not reflected.

For example, in the illustrated embodiment, frequency selective surface 22 has been designed to strongly reflect light 12 having a 2-μm wavelength and particles 60 are selected to be strongly absorbing of light having a 2-μm wavelength. Thus, in this second state, modulation system 10 will poorly reflect (denoted by arrow 16) and/or absorb incident light 12 having a 2-μm wavelength, as shown in FIG. 2B.

FIG. 3 shows an alternative embodiment of modulation system 10 (shown as "modulation system 310") that includes a frequency selective surface 322 comprising an array of separate conducting structures—that is, an "open" frequency selective surface. Similar to modulation system 10, modulation system 310 alters the propagation of incident light through the interaction of frequency selective surface 322 and particles 60 in an analogous manner to that described with respect to FIGS. 1 and 2A-2B. Additionally, to provide an electrical connection between the various edges of the first electrode 20, modulation system 310 includes a conducting layer 324.

Conducting layer 324 comprises an electrically-conductive layer of material on which the conducting structures of frequency selective surface 322 are formed. Conducting layer 324 provides a conductive path across frequency selective surface 322 to relay the applied bias to all points on first electrode 20. In particular embodiments, conducting layer 324 may be chosen so as to not affect the optical properties of frequency selective surface 322 by making conducting layer 324 a relatively weak conductor of electricity. For example, in particular embodiments, conducting layer 324 may represent a 100-Angstrom thick film of a metal oxide, such as titanium oxygen-nitride. In such embodiments, conducting layer 324 may be essentially optically transparent and may have a direct-current electrical conductivity of 5000 ohms per square-centimeter. Other materials may be used for this conductor including, ceramic metal composites, or "cermets," that can provide sheet resistances of 100-to-10,000,000 ohms per unit area of material. Although shown in FIG. 3 as being situated beneath frequency selective surface 322, in alternative embodiments, conducting layer 324 may be positioned in any appropriate manner relative to frequency selective surface 322 and sealed enclosure 40.

Figure 4A:
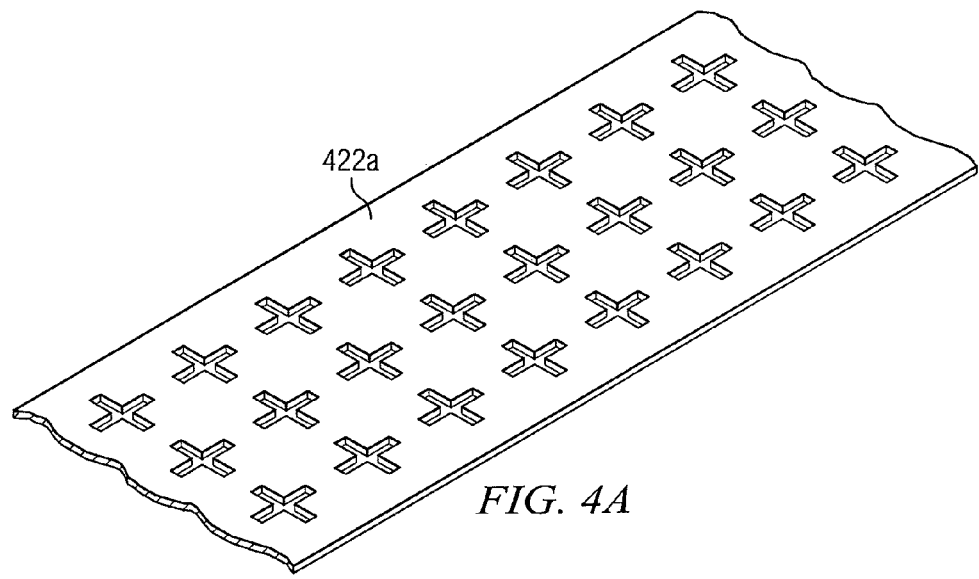
FIGS. 4A-4C show different examples of a frequency selective surface that may be utilized in various embodiment of the light modulator.
Figure 4B:
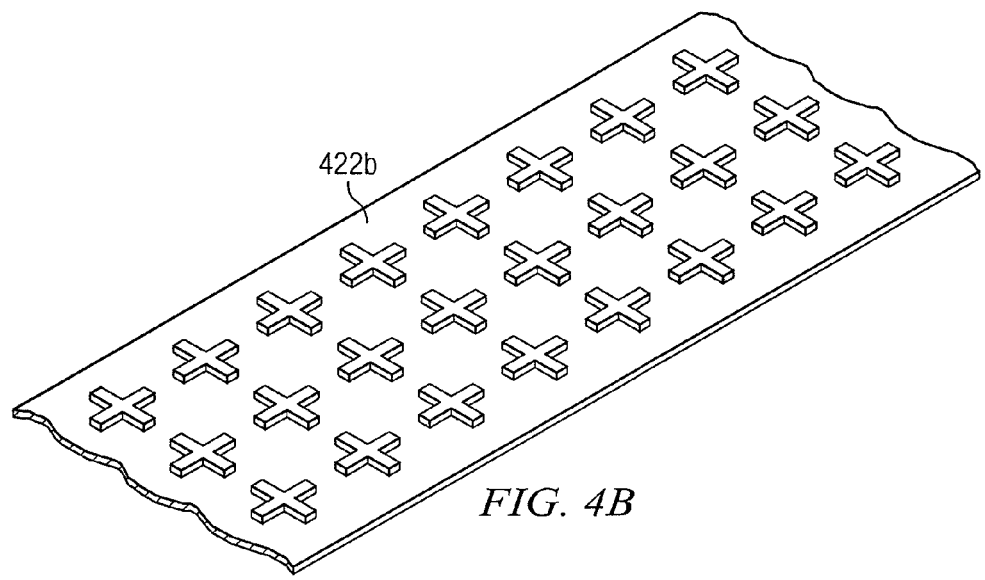
Figure 4C:
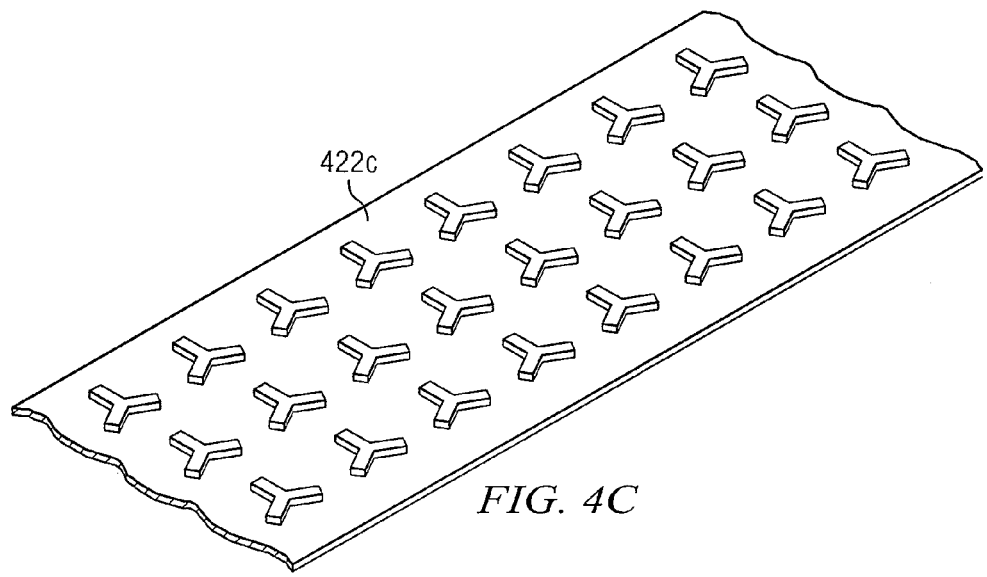

FIGS. 4A-4C show various examples of frequency selective surfaces that may be utilized in particular embodiments of modulation system 10 and/or modulation system 310. FIG. 4A shows a closed frequency selective surface 422a comprising an array of cross-shaped perforations in a metal layer of frequency selective surface 422a. FIG. 4B shows an open frequency selective surface 422b comprising an array of cross-shaped conducting structures. FIG. 4C shows an open frequency selective surface 422c comprising an array of tripole conducting structures. Although FIGS. 4A-4C illustrate particular examples of frequency selective surfaces that may be utilized, various embodiments of modulation system 10 and modulation 310 may use any frequency selective surface suitably designed for the design wavelength and the desired optical effect.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. An apparatus for modulating light, comprising:
 a first electrode comprising a frequency selective surface operable to reflect light having a first wavelength;
 a second electrode spaced apart from the first electrode;
 a sealed enclosure operable to store fluid, wherein at least a portion of the enclosure is positioned between the first electrode and the second electrode;
 electrophoretic fluid stored in the enclosure; and
 a plurality of particles suspended in the electrophoretic fluid and operable to absorb light having the first wavelength, wherein the first electrode is operable to attract the particles towards the frequency selective surface when an electrical bias is applied between the first electrode and the second electrode, wherein the particles are operable to alter an optical reflectance of the frequency selective surface.

2. The apparatus of claim 1, wherein:
 the electrical bias comprises a first electrical bias;
 the first electrode is operable to repel the particles from the frequency selective surface when a second electrical bias is applied between the first electrode and the second electrode; and
 the frequency selective surface is operable to provide specular reflectance of light having the first wavelength when the first electrode is repelling the particles from the frequency selective surface.

3. The apparatus of claim 1, wherein the apparatus is operable to receive a signal, and wherein the first electrode is operable to:
 attract the particles to the frequency selective surface when the signal is in a first state; and
 repel the particles away from the frequency selective surface when the signal is in a second state.

4. The apparatus of claim 1, further comprising a conducting layer that is substantially transparent to light at the first wavelength, and wherein:
 the frequency selective surface comprises an array of metal structures formed on the conducting layer; and
 the conducting layer forms an electrical connection between the metal structures.

5. The apparatus of claim 4, wherein the conducting layer comprises a layer of metal oxide.

6. The apparatus of claim 1, wherein the particles comprise electrically-charged carbon.

7. A method of modulating light, comprising:
 exposing a frequency selective surface to a light source, wherein the frequency selective surface is operable to reflect light having a first wavelength;
 receiving a signal;
 selectively attracting a plurality of particles towards the frequency selective surface based on a state associated with the signal, wherein the particles are suspended in electrophoretic fluid and stored in a sealed enclosure; and
 while the particles are attracted to the frequency selective surface, absorbing light having the first frequency with the particles, and altering an optical reflectance of the frequency selective surface.

8. The method of claim 7, wherein attracting the plurality of particles towards the frequency selective surface comprises generating an electrical bias across a first electrode and a second electrode on opposite sides of the sealed enclosure, wherein the electrical bias attracts the particles towards the frequency selective surface.

9. The method of claim 8, wherein generating the electrical bias across the first electrode and the second electrode comprises:
in response to determining the signal is in a first state, generating a first electrical bias, wherein the first electrical bias attracts the particles towards the frequency selective surface; and
in response to determining that the signal is in a second state, generating a second electrical bias, wherein the second electrical bias repels the particles from the frequency selective surface.

10. The method of claim 9, wherein the frequency selective surface provides specular reflectance of light having the first wavelength when the second electrical bias is repelling the particles from the frequency selective surface.

11. The method of claim 6, wherein the particles comprise electrically-charged carbon.

12. An apparatus for modulating light, comprising:
a first electrode comprising a frequency selective surface operable to reflect light having a first wavelength;
a second electrode spaced apart from the first electrode;
a sealed enclosure operable to store fluid, wherein at least a portion of the enclosure is positioned between the first electrode and the second electrode;
electrophoretic fluid stored in the enclosure; and
a plurality of particles suspended in the electrophoretic fluid, wherein the first electrode is operable to attract the particles towards the frequency selective surface when an electrical bias is applied between the first electrode and the second electrode and wherein the particles are operable to alter a dielectric constant of the frequency selective surface when attracted to the frequency selective surface.

13. The apparatus of claim 12, wherein:
the electrical bias comprises a first electrical bias;
the first electrode is operable to repel the particles from the frequency selective surface when a second electrical bias is applied between the first electrode and the second electrode; and
the frequency selective surface is operable to provide specular reflectance of light having the first wavelength when the first electrode is repelling the particles from the frequency selective surface.

14. The apparatus of claim 12, wherein the apparatus is operable to receive a signal, and wherein the first electrode is operable to:
attract the particles to the frequency selective surface when the signal is in a first state; and
repel the particles away from the frequency selective surface when the signal is in a second state.

15. The apparatus of claim 12, further comprising a conducting layer that is substantially transparent to light at the first wavelength, and wherein:
the frequency selective surface comprises an array of metal structures formed on the conducting layer; and
the conducting layer forms an electrical connection between the metal structures.

16. The apparatus of claim 15, wherein the conducting layer comprises a layer of metal oxide.

17. A method of modulating light, comprising:
exposing a frequency selective surface to a light source, wherein the frequency selective surface is operable to reflect light having a first wavelength;
receiving a signal;
selectively attracting a plurality of particles towards the frequency selective surface based on a state associated with the signal, wherein the particles are suspended in electrophoretic fluid and stored in a sealed enclosure; and
while the particles are attracted to the frequency selective surface, altering a dielectric constant of the frequency selective surface with the particles.

18. The method of claim 17, wherein attracting the plurality of particles towards the frequency selective surface comprises generating an electrical bias across a first electrode and a second electrode on opposite sides of the sealed enclosure, wherein the electrical bias attracts the particles towards the frequency selective surface.

19. The method of claim 18, wherein generating the electrical bias across the first electrode and the second electrode comprises:
in response to determining the signal is in a first state, generating a first electrical bias, wherein the first electrical bias attracts the particles towards the frequency selective surface; and
in response to determining that the signal is in a second state, generating a second electrical bias, wherein the second electrical bias repels the particles from the frequency selective surface.

20. The method of claim 19, wherein the frequency selective surface provides specular reflectance of light having the first wavelength when the second electrical bias is repelling the particles from the frequency selective surface.

* * * * *